(12) United States Patent
Epstein et al.

(10) Patent No.: US 8,095,624 B2
(45) Date of Patent: Jan. 10, 2012

(54) ARCHITECTURE FOR SERVING AND MANAGING INDEPENDENT ACCESS DEVICES

(75) Inventors: Marc Epstein, Los Gatos, CA (US);
Mark Collins, Superior, CO (US); Peter Barclay, San Jose, CA (US); Brian Karney, Palo Alto, CA (US); Glenn Ricart, Salt Lake City, UT (US)

(73) Assignee: CenterBeam Inc., San Jose, CA (US)

( * ) Notice: Subject to any disclaimer, the term of this patent is extended or adjusted under 35 U.S.C. 154(b) by 1750 days.

(21) Appl. No.: 09/750,500

(22) Filed: Dec. 28, 2000

(65) Prior Publication Data

US 2002/0087670 A1 Jul. 4, 2002

(51) Int. Cl.
*G06F 15/177* (2006.01)
(52) U.S. Cl. ..................................... 709/220
(58) Field of Classification Search .................. 709/220
See application file for complete search history.

(56) References Cited

U.S. PATENT DOCUMENTS

| | | | | |
|---|---|---|---|---|
| 5,784,463 A * | 7/1998 | Chen et al. | ..................... | 713/171 |
| 5,903,721 A * | 5/1999 | Sixtus | ........................ | 713/201 |
| 5,974,146 A * | 10/1999 | Randle et al. | .................. | 705/77 |
| 6,112,243 A * | 8/2000 | Downs et al. | .................. | 709/226 |
| 6,189,103 B1 * | 2/2001 | Nevarez et al. | ............... | 713/201 |
| 6,249,836 B1 * | 6/2001 | Downs et al. | .................. | 710/268 |
| 6,339,423 B1 * | 1/2002 | Sampson et al. | ............... | 715/854 |
| 6,349,338 B1 * | 2/2002 | Seamons et al. | .............. | 709/229 |
| 6,374,357 B1 * | 4/2002 | Mohammed et al. | ......... | 713/201 |
| 6,557,169 B1 * | 4/2003 | Erpeldinger | ................... | 717/173 |
| 6,732,358 B1 * | 5/2004 | Siefert | ........................ | 717/173 |
| 6,738,908 B1 * | 5/2004 | Bonn et al. | ........................ | 726/4 |
| 6,757,710 B2 * | 6/2004 | Reed | ............................. | 709/203 |
| 6,763,403 B2 * | 7/2004 | Cheng et al. | .................... | 710/36 |
| 6,826,606 B2 * | 11/2004 | Freeman et al. | ............. | 709/223 |
| 6,826,692 B1 * | 11/2004 | White | ................................ | 726/8 |
| 6,829,654 B1 * | 12/2004 | Jungck | ........................... | 709/246 |
| 6,829,709 B1 * | 12/2004 | Acharya et al. | ............... | 713/160 |
| 6,892,308 B1 * | 5/2005 | Medvinsky | ....................... | 726/6 |
| 6,928,469 B1 * | 8/2005 | Duursma et al. | .............. | 709/223 |
| 6,957,199 B1 * | 10/2005 | Fisher | ............................. | 705/78 |
| 7,080,372 B1 * | 7/2006 | Cole | ............................. | 717/173 |
| 7,127,069 B2 * | 10/2006 | Nguyen | ........................ | 380/278 |

\* cited by examiner

*Primary Examiner* — Hussein A. Elchanti
(74) *Attorney, Agent, or Firm* — Sorin Royer Cooper LLC

(57) ABSTRACT

A method of providing services from a service provider to a plurality of independent entities, includes defining a predetermined one way trust relationship, separating first services wherein the relationship runs from the service provider to the serviced entity from second services wherein the relationship runs from the serviced entity to the service provider, thus preventing transitive trust. Preferably, the second services do not trust the first services.

26 Claims, 2 Drawing Sheets

ARCHITECTURE FOR SERVING AND MANAGING INDEPENDENT ACCESS DEVICES

TECHNICAL FIELD

The present invention relates an improved architecture for managing multiple independent computer users from a common data center. The architecture is particularly applicable in situations wherein multiple substantially independent groups of devices and their users use services from and are managed from a single data center, such as may be implemented when a company outsources its information technologies (IT) needs rather than maintaining an IT department. The present invention is more generally applicable to providing services from a service provider to multiple independent serviced entities.

BACKGROUND OF THE INVENTION

Most businesses have a full set of computer related needs. For example, a business may need Internet access, software updates, hard disk maintenance, etc. Often businesses have plural servers and printers, as well as other peripherals, connected to a network within an office.

Most computer networks are managed by either an in house information technologies (IT) department, or for smaller businesses, an independent computer consultant. The IT department or computer consultant handles all day to day maintenance, software updates, archiving, etc. of the entire computer network in an office environment.

It is possible to save significant costs by outsourcing the management of computer capabilities. The outsourcing model permits a single data center service provider to utilize the most advanced and presumably expensive hardware and software, which would not be economically feasible for a smaller office environment. By distributing the cost of such expensive hardware and software over numerous independent customers, and by sharing the resource, each customer can have the use of the best available security, data backup capabilities, etc. For example, a firewall can be implemented that is far more secure, better tested, and more comprehensive than any firewall that a single small office could afford.

One issue faced by such a data center service provider that provides services to numerous independent customers is that of separation and security between the customers. An example of the problem is described with respect to FIG. 1.

A server "forest" 102 located at a data center 100 serves to supply configuration, management, software support and services to plural different customers 110, 120, 130, and 140. The server forest is denoted as a single triangle, but may represent a network of servers that meet the definition of a forest as explained below and as is known to those in this art. The customer networks 110, 120, 130 and 140 are termed "customer forests", also as that term is known in the art.

A forest is defined as a collection of one or more active directory trees organized as peers and connected by two-way trust relationships between the root domain of each tree. A domain is typically used to refer to collections of one or more computers and users within a single security grouping which are administered as a group. Forests and domains are terms used regularly by those of skill in the art, and are defined in a variety of literature published by Microsoft and other market participants. A forest may also be thought of as a collection of one or more domains that create a single security boundary and management entity.

The architecture shown in FIG. 1 provides that a remote server 102 may provide various types of data services, configuration, management and numerous other services typically required of such systems, to the client computers located in each independent customer network or forest 110, 120, 130 and 140. Data services that are typical of those provided may also include e-mail, dial up access, back-up, anti-virus software, telephony functions, and other similar related functions typically provided in such environments. Configuration and management services such as monitoring operability of the various client computers in various customer sites, software distribution, management, password management, security, and access control, etc. are also contemplated.

One problem encountered with the use of a remote server to handle multiple independent customers is maintaining separation and security among the various customer sites. More specifically, the architecture of FIG. 1 makes it possible for one of the customers to discover the identity of other customers, and their workstations, servers and other devices, and possibly access data by hacking into another customer's site through the server forest 102. Accordingly, in order to give plural customers the assurance that their identity and data will be maintained separate from other customers of the data center, it is important that adequate separation and security be maintained at the server forest 102.

In order for the server to provide the appropriate services, a trust may be setup so that the server forest 102 trusts the client forest 110, 120, 130, or 140. In this manner, server forest 102 can provide appropriate services to clients 104-108 with full confidence in their identity. However, in order for the clients 104-108 to accept software updates, configuration and management commands, etc. from server forest 102, the clients 104 through 108 must trust the server 102. Accordingly, a two-way trust would be required.

The two-way trust results in a compromise of security and separation. More specifically, if the client forests (e.g., 110, 120) trust server forest 102, and the server forest trusts the client forests, then it is possible through the use of a "transitive trust" for the client forests to affect one another through the server forest 102.

In view of the foregoing, there exists a need in the art for an improved method and apparatus for maintaining security and separation among various client forests when connected to a common server forest.

There also exists a need in the art for a technique to provide a set of data services (e.g. shared files backup, remote access, any virus support, etc.) to a plurality of independent client forests and for providing configuration and management of the client forest (e.g. monitoring, software distribution, password and security management, etc.) without compromising the separation among the plural forests.

There also exists a need in the art for providing the authentication typically given by trusts in a manner that avoids the problem of a transitive trust being used by one client forest to compromise the separation and security maintained by the server forest.

SUMMARY OF THE INVENTION

The above and other problems of prior art are overcome in accordance with the present invention which relates to an improved method and apparatus for providing remote data center data services and configuration and management services to a plurality of independent customers, without compromising security or separation. The invention includes defining a predetermined one way relationship, separating services wherein the relationship runs from the service provider to the serviced entity from services wherein the relationship runs from the serviced entity to the service provider, and preferably providing the latter services from a different one or more computers than those from which the former services are provided.

In accordance with a preferred exemplary embodiment the invention, the services provided by the data center are divided into two categories: Data Services and Configuration and Management Services. Data services represent items such as remote access, dial in, shared files, etc. In general, data services represent remotely provided services that are desired by the various entities. The configuration and management services represent functionality such as monitoring and software distribution, configuration and management of the various client computers, password and access control, security, etc. In general, configuration and management services represent remote ways of monitoring, configuring, and updating various client computers. Typically, such configuration and management services are scalable, but this is not a requirement.

"Trusts" are a defined term to those skilled in the art, and generally allow users of one domain to access services in another domain. Microsoft® Corporation defines a trust as follows:

"TRUST RELATIONSHIP: A trust relationship allows users and global groups from another user account database to be used. It is a link between domains that enables pass-through authentication, in which a trusting domain honors the logon authentications of a trusted domain. With trust relationships, a user who has only one user account in one domain can potentially access the entire network. User accounts and global groups defined in a trusted domain can be given rights and resource permissions in a trusting domain, even though those accounts do not exist in the trusting domain's directory database."

In simpler form, a trust is generally recognized in the industry as a relationship between two sets of computers (e.g. domains) that allows users in one of the sets of computers to access resources in another set of computers in a secure way.

In accordance with the exemplary embodiment of the invention, the data services and configuration and management services are divided into two separate forests, each of which may comprise one or more servers. The forests are operated by a service provider that provides IT services to plural unrelated entities, such as various companies that outsource their IT requirements.

A first trust is established so that the data services forest trusts each of the clients' forest, and a second trust is established such that each of the clients trusts the configuration and management forest. In a preferred embodiment, the data services forest also trusts the configuration and management forest.

By the foregoing arrangements of trusts, and as shown in further detail with respect to the detailed description below, no client forest trusts another forest which itself trusts a different client forest. Thus, the problem of transitive trusts being used by one client forest to identify or possibly access or corrupt another client forest is eliminated.

In an additional embodiment, a service provider implements a method of dividing services to be provided to third parties into two categories. A first category includes services that require that the serviced entity trust the service provider. The second category includes those services that require that the service provider trust the serviced entity. First category services are provided from one forest or set of computers, and second category services are provided another forest or set of computers. Optionally, the computers providing the first set of services are trusted by those providing the second set of services. The arrangement of trusts helps avoid any problems caused by transitive trusts. In more general embodiments, the trust need not be utilized, but instead, any one way relationship may be employed, as described more fully below.

The above and other details and objects of the invention will become clearer upon review of the following drawings and detailed description of the preferred embodiment.

DETAILED DESCRIPTION OF THE PREFERRED EMBODIMENT

Figure 1:
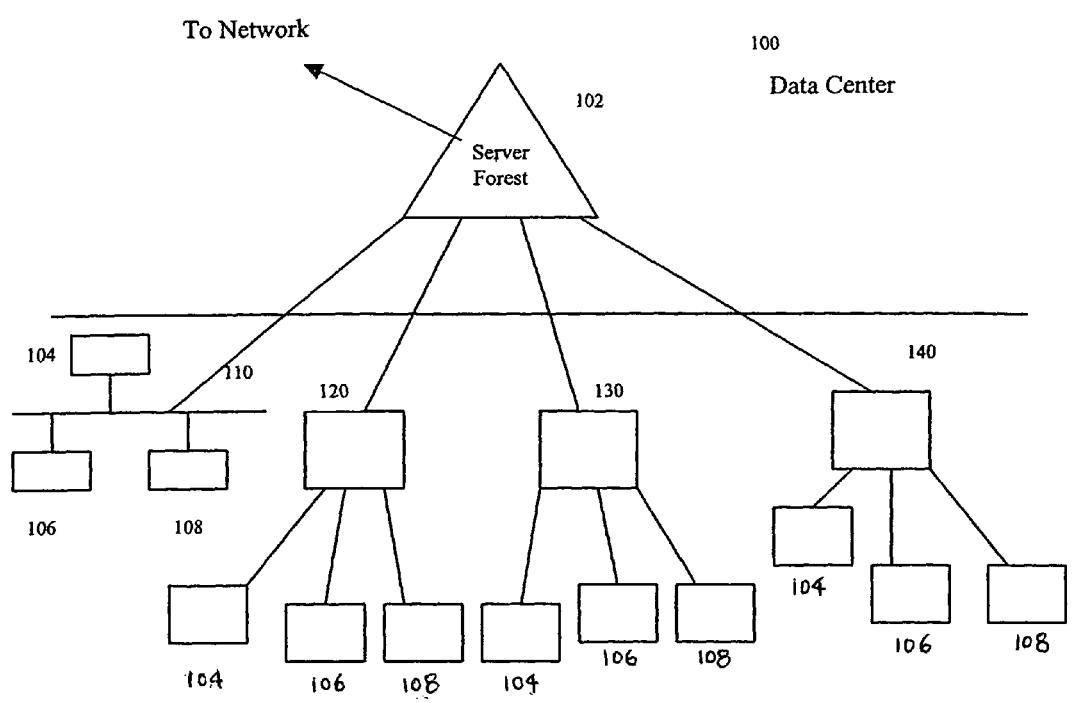
FIG. 1 shows a prior art arrangement wherein the server forest is connected to plural client forests.
Figure 2:
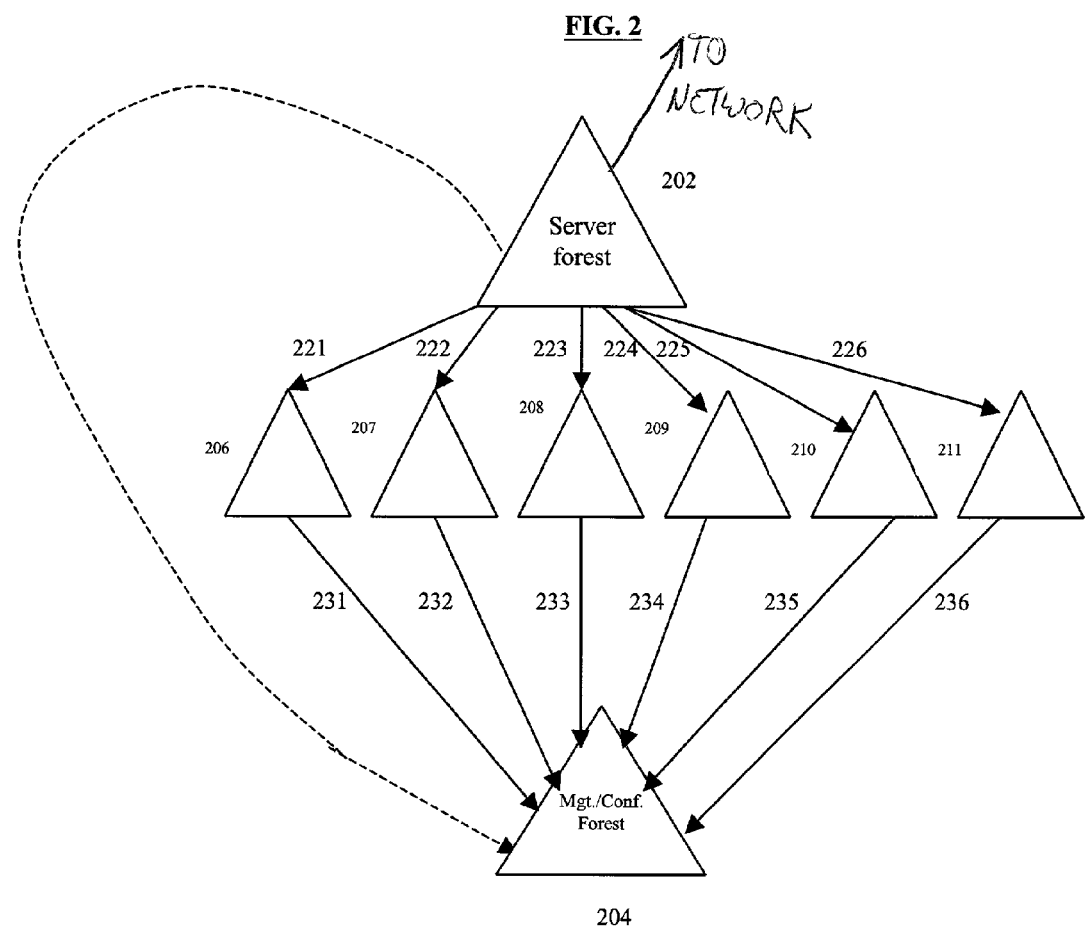
FIG. 2 shows a conceptual block diagram of an exemplary embodiment of the present invention

FIG. 2 shows a block diagram of exemplary embodiment of the present invention. The arrangement of FIG. 2 includes a server forest 202 and management and configuration forest 204, as well as an exemplary set of client forests 206-211. Each of the client forests 206-211 may include a variety of servers, peripherals, client computers, etc. The service forest and management and configuration forest 202 and 204, respectively, would typically include plural servers. The links 221-226 and 231-236 represent trusts, wherein the arrows indicate which forests trust each other. More specifically, link 221, for example, indicates that service forest 202 trusts client forest 206. Link 233 indicates that client forest 208 trusts management and configuration forest 204.

We first note that there are no two-way trusts. Moreover, every client forest (e.g. 207) trusts the configuration and management forest 204. However, management and configuration forest 204 does not trust the service forest 202. As a result of the relationship of the trusts among the forests, there is no possibility for a transitive trust to be used for one of client forests 206-211 to identify or possibly access or corrupt a different client forest. The use of such one way relationships makes it impossible for one of the forests 206-211 to learn the identity of, or to access or corrupt, other ones of the forests 206-211.

In operation, service forest 202 provides relevant services to the client forests 206-211. These services may include, but are not limited to, telephony, anti-virus protection, remote access, dial-in services, backup of files, e-mail hosting and forwarding, etc. The architecture of the service forest will be described in more detail below.

The configuration and management forest provides services such as, for example, monitoring, software updates, software distribution, security, and password management.

If an exemplary client forest 208 receives a software update from the configuration and management forest 204, the client forest 208 can trust the authenticity and validity of the software update, because of the trust relationship indicated as 233.

Notably, the exemplary embodiment above describes separation of the management and configuration forest from the service forest. However, the concept of the interrelationship of the relevant trusts may be extended. More specifically, a service provider providing services to multiple independent entities must engage in numerous interactions between itself and the entities managed and serviced. The interactions can be classified into two groups: (1) Those that require that the entity accepting services or management trust the service provider; and (2) those that require that the service provider trust the entity or group being serviced or managed. By splitting the functionality along such lines, and separating the trustee forest (the forest that is required to trust a different entity) from the trusted forest, (i.e. the forest that is trusted by another entity) the transitive trust problem is avoided.

It can also be appreciated from FIG. 2 that it is possible to provide a trust such that the service forest 202 trusts the management forest 204. By providing such a relationship, the management forest can also manage the service forest to ensure proper configuration, software updates, etc.

FIG. 2 also depicts the connection of the services forest 202 to a network. Such a connection permits telephone services, web hosting, email, etc. to be implemented. The connection shown to the network may connect to a telephone network, a data network, or both. Preferably, both an Internet connection and a Public Switched Telephone Network (PSTN) connection would be present.

It is also notable that the trust relationship can be replaced with one or more other types of relationships in order to achieve substantially the same result. For example, a certificate tree, access control list, or a predetermined token that must be possessed by an entity accessing another entity may be utilized. Whatever the predetermined relationship, the remote service provider is arranged such that the predetermined relationship is one way, and such that a separation of services is implemented. Services where the relationship flows from the service provider to one or more serviced entities form a first set of services, and services where the relationship flows from the serviced entities to the service provider form a second set of services. The first and second sets of services are then provided from different servers or different server forests, or by securely separated software on the same server(s).

Moreover, it is noted that while remote IT services are used herein for exemplary purposes, the invention is not limited thereto. Any type of situation wherein services are provided to a plurality of users may benefit from the separation of services wherein a one way relationship flows from the serviced entity to the servicing entity, from services where the one way relationship flows from the servicing entity to the serviced entity. Other examples include telephony services, plural mobile users of a wireless service, various business and organizational units, unified messaging, voice mail services, etc.

While the above describes the preferred embodiment of the invention, various other modifications and additions will be apparent to those of skill in the art. For example, while we describe herein a situation wherein each customer site is a separate forest containing one domain, that need not be the case. The forest can span multiple customer sites, and can have multiple domains. These and other modifications are intended to be covered by the following claims.

What is claimed is:

1. A method for a service provider to provide services to a plurality of client computers, the method comprising:
   providing a first set of services on a first set of one or more servers of the service provider to the plurality of client computers by providing secure access to the first set of one or more servers by the plurality of client computers, but prohibiting secure access to the plurality of client computers by the first set of one or more servers; and
   providing a second set of services on a second set of one or more servers of the service provider to the plurality of client computers by providing secure access to the plurality of client computers by the second set of one or more servers, but prohibiting secure access to the second set of one or more servers by the plurality of client computers.

2. The method of claim 1 wherein said first set of services comprise data services.

3. The method of claim 2 wherein said second set of services comprise management and configuration services.

4. The method of claim 2 wherein said first set of services comprises at least one service selected from the group consisting of: virus protection services, remote access, backup, software sharing, and telephony services.

5. The method of claim 3 wherein said second set of services comprises at least one service selected from the group consisting of: security, password management, software updates, software distribution, and access control.

6. The method of claim 1 further comprising:
   preventing any said client computer from securely accessing resources in any other said client computer.

7. The method of claim 3 further comprising:
   providing secure access to the first set of one or more servers by the second set of one or more servers.

8. The method of claim 3 further comprising:
   preventing said first set of one or more servers from securely accessing resources in said second set of one or more servers.

9. The method of claim 3 wherein said first set of one or more servers providing said data services and said second set of one or more servers providing said management and configuration services are separate.

10. The method of claim 1 further comprising:
    connecting said first set of one or more servers to at least one of the group consisting of: the Internet, a public switched telephone network, and a data network.

11. A system for providing services to a plurality of client computers, the system comprising:
    a first set of one or more servers for providing a first set of services to the plurality of client computers by providing secure access to the first set of one or more servers by the plurality of client computers, but prohibiting secure access to the plurality of client computers by the first set of one or more servers; and
    a second set of one or more servers for providing a second set of services to the plurality of client computers by providing secure access to the plurality of client computers by the second set of one or more servers, but prohibiting secure access to the second set of one or more servers by the plurality of client computers.

12. The system of claim 11 wherein said first set of services comprise data services.

13. The system of claim 12 wherein said second set of services comprise management and configuration services.

14. The system of claim 12 wherein said first set of services comprises at least one service selected from the group consisting of: virus protection services, remote access, backup, software sharing, and telephony services.

15. The system of claim 13 wherein said second set of services comprises at least one service selected from the group consisting of: security, password management, software updates, software distribution, and access control.

16. The system of claim 11 wherein said system is operable to:
    prevent any said client computer from securely accessing resources in any other said client computer.

17. The system of claim 13 wherein the system is operable to provide secure access to the first set of one or more servers by the second set of one or more servers.

18. The system of claim 13 wherein said system is operable to:

prevent said first set of one or more servers from securely accessing resources in said second set of one or more servers.

19. The system of claim 13 wherein said first set of one or more servers providing said data services and said second set of one or more servers providing said management and configuration services are separate.

20. The system of claim 11 wherein said first set of one or more servers is connected to at least one of the group consisting of: the Internet, a public switched telephone network, and a data network.

21. A method for a service provider to provide services to a plurality of client computers, the method comprising:
separating the services provided by the service provider into a first group of services provided by a first group of one or more servers of the service provider, and a second group of services provided by a second group of one or more servers of the service provider;
providing the first set of services from the first set of servers through a one-way trust connection from the first set of servers to the client computers; and
providing the second set of services from the second set of servers to the client computers through a one-way trust connection from the client computers to the second set of servers.

22. The method of claim 21 further comprising:
preventing any said client computer from gaining secure access to any other said client computer.

23. The method of claim 21 wherein said first set of services comprises at least one service selected from the group consisting of: virus protection services, remote access, backup, software sharing, and telephony services.

24. The method of claim 21 wherein said second set of services comprises at least one service selected from the group consisting of: security, password management, software updates, software distribution, and access control.

25. A method for providing services from a service provider to a plurality of client computers, the method comprising:
enabling a first set of services on a first set of servers of the service provider through a one-way trust connection from the first set of servers to the plurality of client computers;
enabling a second set of services on a second set of servers of the service provider to the plurality of client computers through a one-way trust connection from the client computers to the second set of servers; and
providing the first and second sets of services.

26. A system for providing services to a plurality of client computers, the system comprising:
a first set of servers for providing a first set of services to the plurality of client computers through a one-way trust relationship from the first set of servers to the plurality of client computers; and
a second set of servers for providing a second set of services to the plurality of client computers through a one-way trust relationship from the plurality of client computers to the second set of servers.

* * * * *